Feb. 15, 1966
R. C. DAY
3,235,296
EXTENSIBLE AND RETRACTIBLE IMPLEMENT HANDLE
Filed May 18, 1962
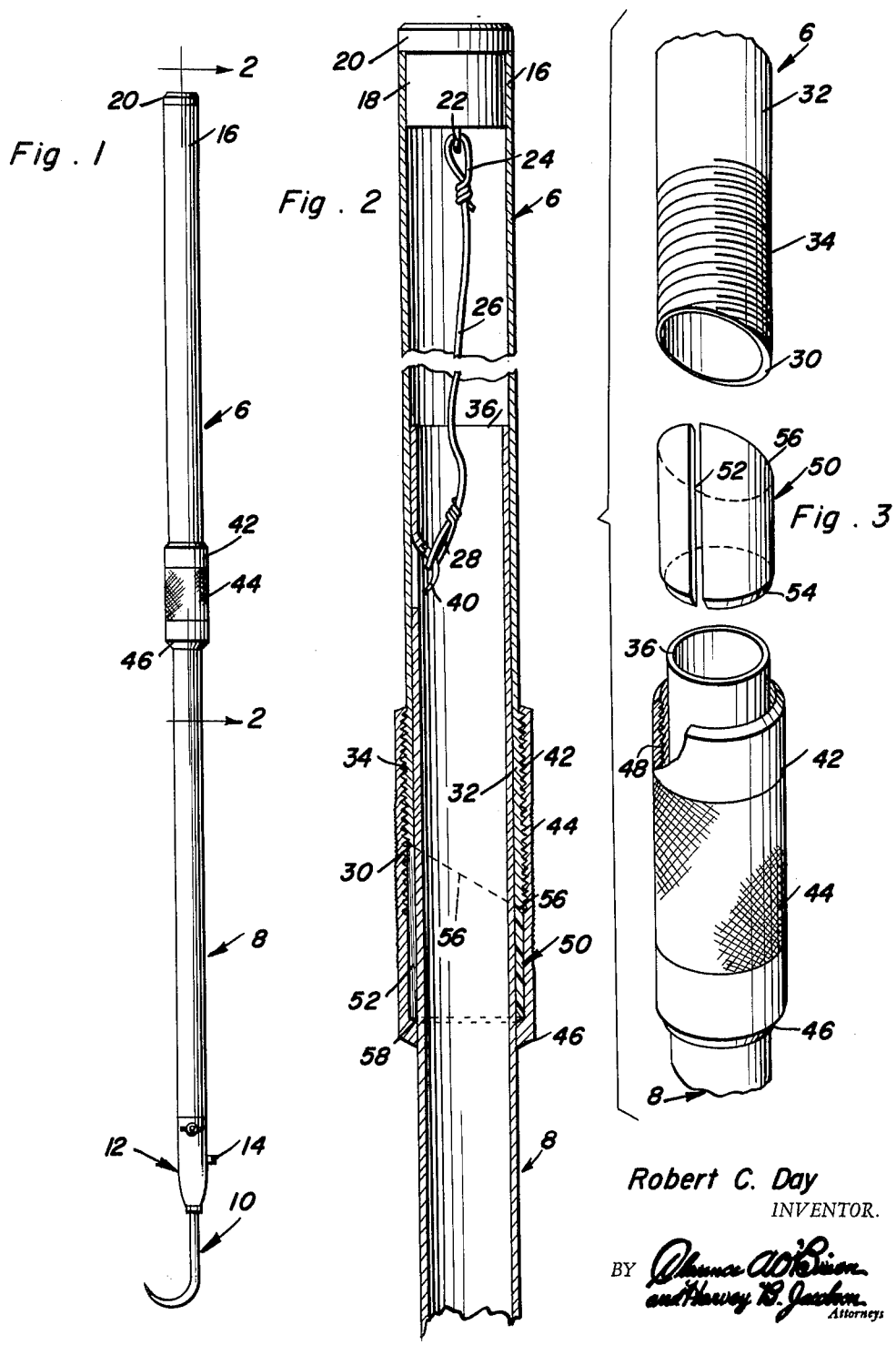
Robert C. Day
INVENTOR.
BY
Attorneys

United States Patent Office 3,235,296
Patented Feb. 15, 1966

3,235,296
EXTENSIBLE AND RETRACTIBLE
IMPLEMENT HANDLE
Robert C. Day, Baker, La.
(1200 Florence Drive, Lafayette, La.)
Filed May 18, 1962, Ser. No. 195,817
4 Claims. (Cl. 287—58)

This invention relates to a longitudinally adjustable implement handle and has to do with a handle which is expressly, but not necessarily, designed and adapted to support and handle a plurality of interchangeable fishing and crabbing implements, such as, for examples, a crab net, gaff, harpoon, frog grab and the like.

An object of the invention is to improve upon prior art implement handles, for instance, upon the multipurpose handle disclosed in my prior Patent 3,004,362 issued on October 17, 1961. To this end the instant handle is equipped at the forward or distal end with an implement adapter constructed as shown and covered in the above-identified patent and not herein specifically claimed. Primarily the improvement herein disclosed has to do with the handle itself in that it is of readily extensible and retractible construction and can be quickly adjusted in length within a five to ten foot range, whereby to better serve the ever-varying needs of the user As will be hereinafter evident the handle herein revealed not only provides a simple, practical and compact device, it is unique in that it is characterized by telescoping inner and outer tubes or tubular sections which, when fully telescoped to the five-foot length, provides a rigid double-wall adaptation and provides for an infinite number of adjustments between the five and ten foot range, and what is more important it embodies a novel coupling and friction-type clamping means clampingly uniting the tubes or sections at the predetermined settings desired.

Briefly the invention comprises a handle embodying elongated forward or inner and rearward or outer companion tubes or sections which are telescopically and slidingly fitted together whereby the handle is capable of being lengthened and shortened at will. Means is mounted on the leading or forward end of the handle for positively securing an attachable and detachable implement thereto, for example, the gaff herein illustrated. Suitable means is embodied in an element carried by the handle sections or tubes to limit the relative sliding movemen of the sectons so that they cannot be accidentally extended beyond a predetermined point and thus undesirably parted. Manually adjustable and regulatable jointing means is associated with and carried by the handle sections for clamping and frictionally retaining these sections in a predetermined or set relationship. This friction clamping means functions to secure the sections to each other in any selected position or relationship and prevents relative turning thereof regardless of the twisting force that may be applied at either or both ends of the overall handle.

Other features and advantages of the invention will become more readily apparent from the following description and the accompanying drawing wherein like reference numerals are applied to like parts throughout the views. In the drawing:

FIGURE 1 is a view in elevation of an adjustable implement handle constructed in accordance with the principles of the present invention and showing the sections fully extended and the aforementioned implement attached to the distal or outer end in readiness for use;

FIGURE 2 is an enlarged detail sectional view taken approximately on the plane of the longitudinal section line 2—2 of FIGURE 1; and FIGURE 3 is an exaggerated view of an exploded type with the component parts in their cooperating relationship and in readiness for assemblage.

The inward or proximal tube or section of the handle is denoted generally by the numeral 6 and the complemental outward or distal tube or section is denoted by the numeral 8. Both sections are hollow tubes and constructed from appropriate material. The implement which is to be attached is denoted generally at 10 and is representative of one or any number of fishing and crabbing implements which are adapted to be accommodated as disclosed, for example, in the aforementioned Patent 3,004,362. The implement shown is a gaff and is removably mounted in the adapter or socket 12 which is provided with a spring-loaded latch 14 all as shown and described in the aforementioned patent.

The inner tube section is provided at its inner end portion 16 with a plug 18 which is fitted into the bore and is held in place by a positioning and retaining flange 20. This plug is friction-fitted and can, if desired, be removed. The inner end portion thereof is provided with an eye 22 to accomodate an attached loop 24 on one end of a flexible limit cable or equivalent element 26. The other end of this cable is provided with a similar loop 28 which will be referred to later on. Continuing with the inner tube or section 6 it will be seen, particularly in FIG. 3, that the outward or forward end portion is mitered or cut across on an oblique angle of approximately 60 degrees as at 30. This inner end portion 32 is also provided with external screw-threads 34. The outer tube or tubular section 8 is of a cross-sectional diameter less than that of the section 6 and consequently the inward or rearward end portion 36 is fitted slidingly and telescopingly into the bore of the tube or section 6 for lengthwise adjustment purposes. As is evident the exterior surface of the section 8 is smooth to facilitate making the necessary lengthwise adjustment between the two sections. It will be noted that the upper end portion 36 has a struck-out tongue which is fashioned into an anchoring hook 40 and the loop 28 is detachably connected thereto. Consequently the cable 26 functions to limit the parting of the two sections 6 and 8 so that they will not become accidentally disconnected or separated.

With reference now to the novel friction manually adjustable clamping means or device it will be seen that this means is characterized by a sleeve 42 of prerequisite length. If desired the median exterior surface portion of the sleeve may be knurled as at 44 to facilitate handling and adjusting the sleeve. The lower end portion 46 of the sleeve snugly surrounds but is slidable on the smooth surface of the encompassed tube 8, as is clear in FIG. 2. The upper end portion of the sleeve telescopingly receives the screw-threaded end portion 34 of the section 32 and is internally screw-threaded as at 48 to obtain the desired adjustable connection between the sleeve 42 and the section 6. Interposed or sandwiched between the interior of the sleeve and exterior surface of the section 8 is a novel expansible and contractible bushing 50. This bushing is fitted into the sleeve and is provided with a lengthwise slot 52, has a beveled lower end 54 and a mitered end 56. This mitered or oblique angled end portion is also 60 degrees and consequently corresponds with the oblique or mitered end 30 and abuts the same when the parts are assembled as illustrated in FIG. 2. The length of the bushing is such that it is interposed between the parts in the manner illustrated with the beveled lower end abutting or contacting a corresponding interior bevel 58 provided at the end portion 46 of the sleeve. In practice the bushing 50 is preferably constructed of a suitable grade of plastic material or Fiberglas and may if desired be thinner than the walls of the tubes or sections 6 and 8.

When the sleeve 42 is loosened in an obvious manner it will be evident that the sections 6 and 8 may be freely adjusted relative to each other to regulate the overall length of the handle to the extent desired. Then, by setting the sections at desired positions relative to each other and tightening the sleeve the clamping and friction retaining effect takes place. The sleeve, applying pressure to the bushing when it is tightened, causes the bushing to be pressured off-center because of the coaction of the mitered or angled surfaces 30 and 56. This causes the jamming effect on the coupling or union. There is also a friction gripping effect caused by the coaction of the beveled ends 55 and 58 which functions to reduce the diameter of the bushing and to cause it to tightly grip the section 8. When the union is thus tightened it holds firmly and the two handle sections cannot become accidentally loosened by differential twisting pressure applied to either section of the handle. It follows that the friction-type clamping means secures the adjustable or telescoping sections in whatever position and relationship desired regardless of the twisting force that may be applied to either end of the overall handle.

It is believed that a careful consideration of the description in conjunction with the views of the drawing and the invention as claimed will enable the reader to obtain a clear and comprehensive understanding of the construction and cooperative arrangement of component parts. The mode of use and operation and features and advantages being evident a more extended description is thought to be unnecessary.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable implement handle comprising an elongated tube providing, when in use, an inwardly disposed handle section, the outwardly disposed end of said tube being externally screw-threaded and being cut across on an angular slant and thus providing a mitered terminal end, a complemental elongated tube axially aligned with said first-named tube and of a lesser cross-section than said first-named tube and constituting an outwardly held handle section and having a non-threaded end portion fitting telescopingly and slidingly into the bore of the first-named tube, and bushing split lengthwise and thus being radially expansible and contractible, the end of said bushing adjacent to the mitered terminal end of said first-named tube being mitered and being in abutting relation with said mitered terminal end, the opposite outwardly disposed end of said bushing being beveled, and a coupling sleeve embracing coacting portions of both of said tubes and being internally screw-threaded at an inwardly disposed end and adjustably screwed on the screw-threaded end of said first-named tube, a portion of said sleeve snugly embracing and covering said bushing, the outer end of the sleeve being provided with an interior bevel, and the adjacent beveled end of said bushing abutting said interior bevel whereby when said sleeve is tightened by screwing the same along the first-named tube, said bushing is acted on and is securely tightened around the cooperating portion of the second-named tube with the result that the tubes are clampingly and frictionally connected together.

2. The structure defined in claim 1 and in combination, a plug fitted into and closing an inward end portion of said first-named tube, said plug having an enclosed end provided with a cable anchoring eye, an inner end portion of the telescoping end portion of said outwardly disposed tube having a struck-out tongue fashioned into a cable anchoring hook, and a limit cable having one end secured to said eye and the other end detachably connected to said hook.

3. A manually adjustable extensible and retractible portable implement handle comprising: an elongated forward section and a companion rearward section, adjacent ends of said sections having cooperating end portions telescopically and slidingly fitted together whereby the overall handle is then capable of being lengthened and shortened at will, means mounted on the leading end of the forward section for positively securing an attachable and detachable implement thereto, flexible means carried by and enclosed within said sections and serving to limit the sliding movement of the sections in one direction so that they cannot be extended beyond a predetermined point and accidentally and undesirably parted, and manually adjustable and regulatable jointing means carried by said sections for clamping the same in friction-retained relationship, said means functioning to secure the sections to each other in any selected relationship and preventing relative differential turning notwithstanding the twisting force applied at either or both ends of the overall handle, said jointing means embodying a sleeve surrounding limited telescoping end portions of said sections and having one end adjustably connected to an end of said rearward section and another end slidingly embracing the corresponding end of the forward section, and complemental means confined within the sleeve and interposed between said sleeve and that portion of said forward section encircled thereby, said complemental means being characterized by a split bushing, an outward end of said bushing having end thrust engagement with the cooperating outer end of said sleeve, the inner end of said bushing and the adjacent outer end of said rearward section both being mitered, said mitered ends abutting each other.

4. A manually adjustable longitudinally extensible and retractible portable handle comprising an inwardly disposed elongated tube having a terminal externally screw-threaded outer end portion, the terminal of said outer end portion being provided with a 60 degree miter, a coupling sleeve having an inward rearward end portion internally screw-threaded and screwed on the threads of said outer end and also having an internally disposed non-screw-threaded portion projecting beyond said miter and terminating in an endless annular interior bevel, an elongated outwardly disposed tube complemental to said first-named tube and having an inward end portion passing axially through said sleeve, bridging a gap between the beveled outer end of the sleeve and said mitered outer end of said inwardly disposed tube and also telescoping into the bore of said first-named tube and being slidingly adjustable relative to the latter, and a relatively short longitudinally split expansible and contractible friction clamping bushing encircling a rearward inner end portion of said outwardly disposed tube and confined between the latter and the surrounding sleeve, said bushing having a rearwardly disposed 60 degree miter conformingly abutting the first-named miter and having an outer end provided with an endless bevel and said bevel cooperating with the interior bevel at the outwardly disposed end of said sleeve.

(References on following page)

References Cited by the Examiner

UNITED STATES PATENTS

| | | | |
|---|---|---|---|
| 29,113 | 7/1860 | Stratton | 285—114 |
| 640,165 | 12/1899 | O'Connor | 287—58 X |
| 808,992 | 1/1906 | Lawson | 287—58 X |
| 1,412,561 | 4/1922 | McKenna et al. | 287—58 |
| 2,520,652 | 8/1950 | Pfauser et al. | 74—544 |
| 2,944,847 | 7/1960 | Chadowski | 287—117 |
| 2,991,096 | 7/1961 | Davidson | 287—58 |
| 3,004,362 | 10/1961 | Day | 43—6 |

FOREIGN PATENTS 916,258    8/1954    Germany.

BROUGHTON G. DURHAM, *Primary Examiner.*

DON A. WAITE, *Examiner.*

C. F. GREEN, *Assistant Examiner.*